(12) United States Patent
Yang et al.

(10) Patent No.: US 9,753,223 B2
(45) Date of Patent: Sep. 5, 2017

(54) MULTIWAVELENGTH OPTICAL SUB-ASSEMBLY MODULE

(71) Applicant: Optowell Co., Ltd., Jeonju-Si, Jeollabuk-Do (KR)

(72) Inventors: Gye Mo Yang, Jeonju-Si (KR); Jeong Kwon Son, Jeonju-Si (KR); Sae Young Han, Jeonju-Si (KR); Sun Young So, Jeonju-Si (KR)

(73) Assignee: Optowell Co., Ltd., Jeonju-Si, Jeollabuk-Do (KR)

( * ) Notice: Subject to any disclaimer, the term of this patent is extended or adjusted under 35 U.S.C. 154(b) by 0 days.

(21) Appl. No.: 15/302,942

(22) PCT Filed: Apr. 8, 2014

(86) PCT No.: PCT/KR2014/003040
§ 371 (c)(1),
(2) Date: Oct. 7, 2016

(87) PCT Pub. No.: WO2015/156431
PCT Pub. Date: Oct. 15, 2015

(65) Prior Publication Data
US 2017/0031100 A1    Feb. 2, 2017

(51) Int. Cl.
*G02B 6/42* (2006.01)
*G02B 6/293* (2006.01)
(Continued)

(52) U.S. Cl.
CPC ........... *G02B 6/29365* (2013.01); *G02B 6/28* (2013.01); *G02B 6/293* (2013.01); *G02B 6/2938* (2013.01);
(Continued)

(58) Field of Classification Search
CPC .. G02B 6/293; G02B 6/29365; G02B 6/2938; G02B 6/32; G02B 6/4215; G02B 6/4257; G02B 6/4246
See application file for complete search history.

(56) References Cited

U.S. PATENT DOCUMENTS 6,201,908 B1 *  3/2001  Grann ............... G02B 6/29358
                                                          385/24
6,731,882 B1 *  5/2004  Althaus .............. H01L 31/0203
                                                          257/E31.095
(Continued)

FOREIGN PATENT DOCUMENTS

| KR | 10-2005-0079888 A | 8/2005 |
|---|---|---|
| KR | 20120030265 A | 3/2012 |
| KR | 10-2014-0090006 A | 7/2014 |

OTHER PUBLICATIONS

International Search Report, dated Dec. 29, 2014, from corresponding International Application No. PCT/KR2014/003040.

*Primary Examiner* — Daniel Petkovsek
(74) *Attorney, Agent, or Firm* — Wolf, Greenfield & Sacks, P.C.

(57) ABSTRACT

A multiwavelength optical sub-assembly module including a housing to be connected to an optical cable, a plurality of optical filter units coupled to the housing and configured to guide optical signals, a plurality of transceiver units coupled to the housing and configured to receive the optical signals through the optical filter units or transmit the optical signals to the optical filter units, and a substrate coupled to each of the transceiver units. Thus, distortion of an optical signal is suppressed, and the defect rate of a product is allowed to be decreased by evaluating reliability.

11 Claims, 12 Drawing Sheets

(51) Int. Cl.
*G02B 6/28* (2006.01)
*G02B 6/32* (2006.01)

(52) U.S. Cl.
CPC ............ *G02B 6/32* (2013.01); *G02B 6/4215* (2013.01); *G02B 6/4246* (2013.01); *G02B 6/4257* (2013.01); *G02B 6/4281* (2013.01)

(56) References Cited

U.S. PATENT DOCUMENTS

| | | | |
|---|---|---|---|
| 6,959,133 B2 * | 10/2005 | Vancoill | G02B 6/4204 385/140 |
| 7,088,518 B2 * | 8/2006 | Tatum | G02B 27/145 359/589 |
| 7,184,621 B1 | 2/2007 | Zhu | |
| 7,450,858 B2 * | 11/2008 | Verdiell | H01S 5/4087 398/164 |
| 7,729,569 B2 * | 6/2010 | Beer | G02B 6/4204 385/14 |
| 8,641,298 B2 * | 2/2014 | Lim | G02B 6/4246 385/14 |
| 2003/0152336 A1 | 8/2003 | Gurevich et al. | |
| 2006/0088255 A1 * | 4/2006 | Wu | G02B 6/2938 385/92 |
| 2006/0274999 A1 | 12/2006 | Wu et al. | |
| 2008/0247713 A1 * | 10/2008 | Tamura | G02B 6/4206 385/93 |

* cited by examiner

MULTIWAVELENGTH OPTICAL SUB-ASSEMBLY MODULE

CROSS-REFERENCE TO RELATED APPLICATIONS

This application is the national phase of International Application No. PCT/KR2014/003040, filed on Apr. 8, 2014, which is hereby incorporated by reference to the maximum extent allowable by law.

TECHNICAL FIELD

The present invention relates to a multiwavelength optical sub-assembly module, and more particularly, to a multiwavelength optical sub-assembly module which allows a defective device to be replaced when a partial defect occurs therein and allows reliability for each device to be evaluated, and of which overheating is prevented.

BACKGROUND ART

Generally, an optical transceiver module which is applied to an optical transmission system refers to a module which transmits an optical signal emitted from a light emitting device through an optical fiber and detects the optical signal received through the optical fiber using a light receiving device.

The optical transceiver module basically includes light emitting and receiving devices packaged in a TO-CAN type, a printed circuit board (PCB) that drives the light emitting device and receives a signal detected by the receiving device, a case in which the emitting and receiving devices and the PCB are mounted, a pin connecter for transmitting and receiving an electric signal, and the like.

The emitting and receiving devices is each included in an optical sub-assembly of a receptacle type, which is easy to use as an optical interface in an optical path, and are packaged with a TO-CAN formed of a metal material.

A plurality of pins connected to the optical sub-assembly are connected to an anode and a cathode of a laser or photo diode included in the light emitting and receiving devices.

The optical fiber may simultaneously guide optical signals having wavelengths different form each other, and a multiwavelength optical sub-assembly module transceives a plurality of optical signals having wavelengths different from each other through one optical fiber.

Since a plurality of chips are installed on one substrate in a conventional multiwavelength sub-assembly module, the chips are simultaneously optically arranged through a lens array, and therefore, there is a problem in that an optical arrangement is difficult and takes long time.

In addition, since the plurality of chips are mounted on one substrate in the conventional multiwavelength sub-assembly module, there is a problem in that a product defect occurs due to overheating.

Meanwhile, when a defect occurs in one of the plurality of chips in the conventional multiwavelength sub-assembly module, there is a problem in that the entire produce has to be scrapped.

In addition, since evaluation of an individual optical device is impossible, there is a problem in that a process of screening samples having poor reliability cannot be performed while products are manufactured. Accordingly, a need for reducing the above problem is required.

Meanwhile, a background of the present invention is disclosed in Korean Laid-open Patent Application No. 2012-0030265 (Mar. 28, 2012, Invention Title: WAVELENGTH DIVISION MULTIPLEXER AND DEMULTIPLEXER).

DISCLOSURE

Technical Problem

The present invention is directed to providing a multiwavelength optical sub-assembly module in which individual substrates are applied, only a defective substrate may be replaced during a manufacturing process when a defect occurs in one substrate of the individual substrates, and reliability of a product may be improved by screening devices having poor reliability, and of which overheating is prevented by disposing the substrates in a dispersed manner.

Technical Solution

One aspect of the present invention provides a multiwavelength optical sub-assembly module including: a housing to be connected to an optical cable; a plurality of optical filter units coupled to the housing and configured to guide optical signals; a plurality of transceiver units coupled to the housing and configured to receive the optical signals through the optical filter units or transmit the optical signals to the optical filter units; and a substrate coupled to each of the transceiver units.

The housing may include: a body unit; a plurality of filter installation units formed on the body unit and having the optical filter units installed thereon; and a lens unit formed on the body unit and configured to arrange an optical signal transceived through the optical cable.

The filter installation unit may be respectively coupled to an edge of the optical filter unit so as not to interfere with the optical signal.

The optical filter unit may include: a lens light guide unit for transmission disposed on a straight line with the lens unit and configured to pass an optical signal having a set wavelength or more and to reflect an optical signal having a wavelength less than the set wavelength to guide the optical signal to the lens unit; an optical reflection unit for transmission disposed to face the lens light guide unit for transmission and configured to reflect an optical signal and guide the optical signal to the lens light guide unit for transmission; a long wavelength guide unit for transmission disposed on a straight line with the lens light guide unit for transmission and configured to guide an optical signal generated by the transceiver unit to the lens light guide unit for transmission; a receiving guide unit for transmission disposed on a straight line with the lens light guide unit for transmission and configured to guide an optical signal passing through the long wavelength guide unit for transmission to the transceiver unit; and a short wavelength guide unit for transmission disposed on a straight line with the optical reflection unit for transmission and configured to guide an optical signal generated by the transceiver unit to the optical reflection unit for transmission.

The short wavelength guide unit for transmission may include three short wavelength guide units for transmission, and reflect an optical signal having a wavelength that is shorter with increasing distance from the optical reflection unit for transmission, and the long wavelength guide unit for transmission may include two long wavelength guide units for transmission, and reflect an optical signal having a wavelength that is longer with increasing distance from the lens light guide unit for transmission.

The transceiver unit may include: a plurality of optical transmission units for transmission configured to generate optical signals and transmit the optical signals to each of the short wavelength guide units for transmission and the long wavelength guide units for transmission; and an optical receiving unit for transmission configured to receive an optical signal reflected by the receiving guide unit for transmission.

The optical filter unit may include: a lens light guide unit for reception disposed on a straight line with the lens unit and configured to pass an optical signal having a set wavelength or more and to reflect an optical signal having a wavelength less than the set wavelength; an optical reflection unit for reception disposed to face the lens light guide unit for reception and configured to guide an optical signal reflected by the lens light guide unit for reception; a long wavelength guide unit for reception disposed on a straight line with the lens light guide unit for reception and configured to guide an optical signal passing through the lens light guide unit for reception to the transceiver unit; a transmission guide unit for reception disposed on a straight line with the lens light guide unit for reception and configured to guide an optical signal generated by the transceiver unit to the lens light guide unit for reception; and a short wavelength guide unit for reception disposed on a straight line with the optical reflection unit for reception and configured to guide an optical signal reflected by the optical reflection unit for reception to the transceiver unit.

The short wavelength guide unit for reception may include three short wavelength guide units for reception, and reflect an optical signal having a wavelength that is shorter with increasing distance from the optical reflection unit for reception, and the long wavelength guide unit for reception may include two long wavelength guide units for reception, and reflect an optical signal having a wavelength that is longer with increasing distance from the optical reflection unit for reception.

The transceiver unit may include: an optical transmission unit for reception configured to generate an optical signal and transmit the optical signal to the transmission guide unit for reception; and a plurality of optical receiving units for reception configured to receive optical signals reflected by each of the short wavelength guide unit for reception and the long wavelength guide unit for reception.

The multiwavelength optical sub-assembly module may further include an optical arrangement unit coupled to the housing, disposed between the optical filter unit and the transceiver unit, and configured to arrange the optical signals.

The optical arrangement unit may include: an optical arrangement body coupled to the housing; an optical arrangement lens formed on the optical arrangement body and configured to arrange an optical signal passing between the optical filter unit and the transceiver unit; and an optical arrangement coupling portion formed on the optical arrangement body and coupled to the transceiver unit.

The transceiver unit may include: a rigid board coupled to the optical arrangement coupling portion; a flexible board coupled to the rigid board and connected to the substrate; and an optical device mounted on the flexible board and configured to transceive an optical signal.

The transceiver unit may be manufactured on a matrix-type board in which a plurality of boards are integrated.

The multiwavelength optical sub-assembly module may further includes a screening filter unit disposed between the optical filter unit and the transceiver unit and configured to pass only an optical signal having a selected wavelength.

Advantageous Effects

In the multiwavelength optical sub-assembly module according to the present invention, the plurality of transceiver units transceive optical signals having wavelength bands different from each other, and thus, there is an effect in that the optical signals can be easily transmitted through a single cable.

In the multiwavelength optical sub-assembly module according to the present invention, since the plurality of transceiver units are separately installed, there is an effect in that when individual defects occur in the multiwavelength optical sub-assembly module, only the defective parts can be replaced and the multiwavelength optical sub-assembly module can be used.

In the multiwavelength optical sub-assembly module according to the present invention, reliability evaluation of the optical device is possible, and thus, there is an effect in that reliability of a product is improved.

In the multiwavelength optical sub-assembly module according to the present invention, since the plurality of transceiver units are separated and installed, density of parts is lowered, and therefore, there is an effect in that overheating is prevented.

In the multiwavelength optical sub-assembly module according to the present invention, an optical signal is doubly optically arranged by the optical arrangement units and lens unit, and thus, there is an effect in that distortion of the optical signal is suppressed.

In the multiwavelength optical sub-assembly module according to the present invention, a screening filter unit is disposed between the transceiver unit and the optical filter unit, and thus, there is an effect in that interference is prevented between optical signals having different wavelength bands.

In the multiwavelength optical sub-assembly module according to the present invention, since mass production of the transceiver units is possible in a production line, there is an effect in that productivity is improved.

DETAILED DESCRIPTION

Figure 1:
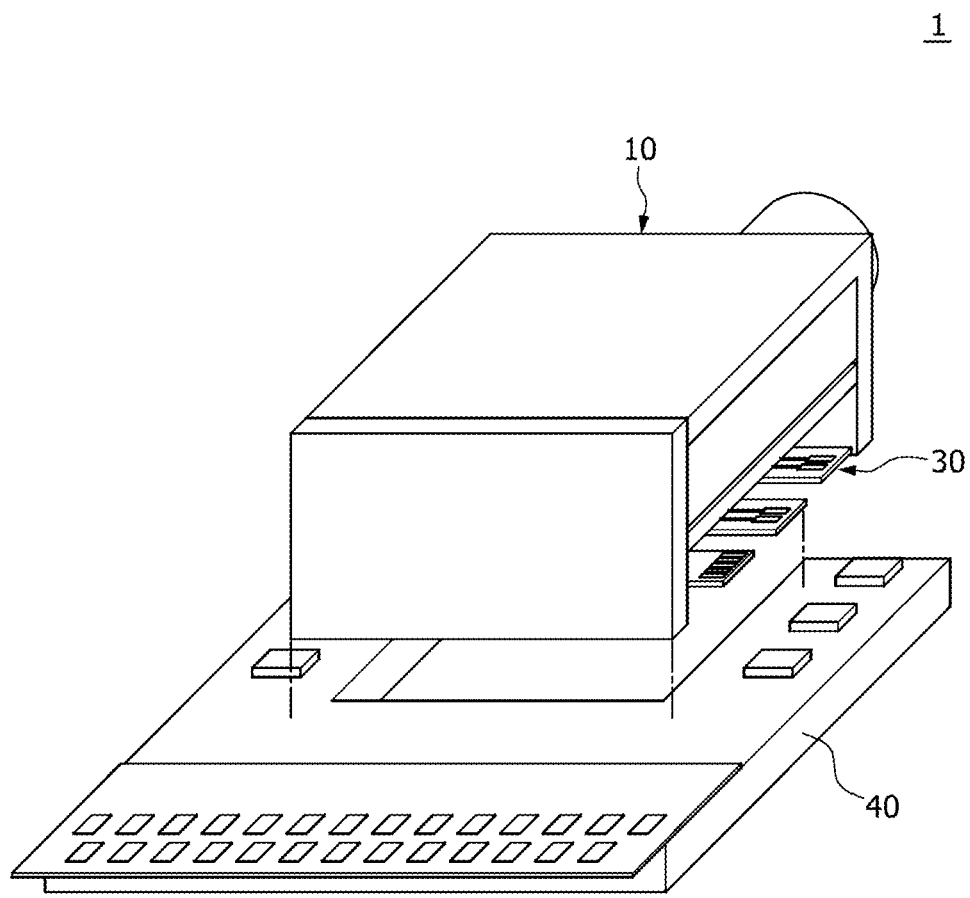
FIG. 1 is a schematic perspective view illustrating a multiwavelength optical sub-assembly module according to one embodiment of the present invention.

Hereinafter, a multiwavelength optical sub-assembly module according to the present invention will be described with reference to the accompanying drawings. In the specification, thicknesses of lines shown in the drawings, sizes of components, and the like can be illustrated with exaggeration for clarity and convenience of description. In addition, some terms described below are defined by considering functions of the invention, and meanings may vary depending on, for example, a user's or an operator's intentions or customs. Therefore, the meanings of terms should be interpreted based on the content throughout this specification.

Figure 2:
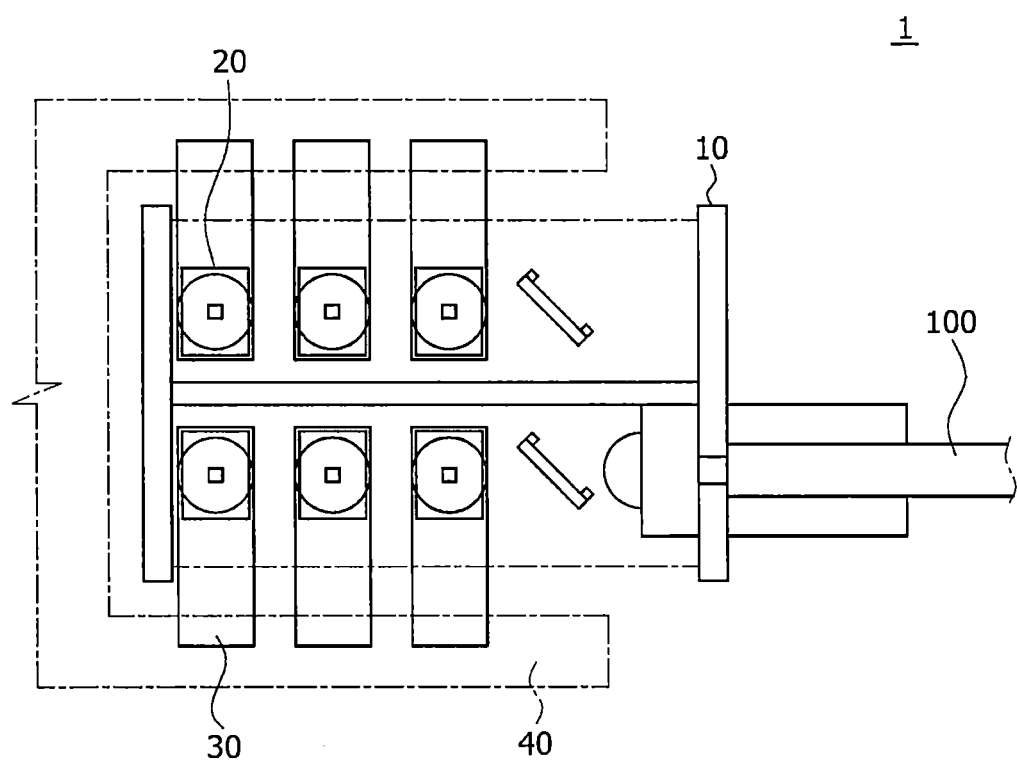
FIG. 2 is a schematic plan view illustrating the multiwavelength optical sub-assembly module according to one embodiment of the present invention.
Figure 3:
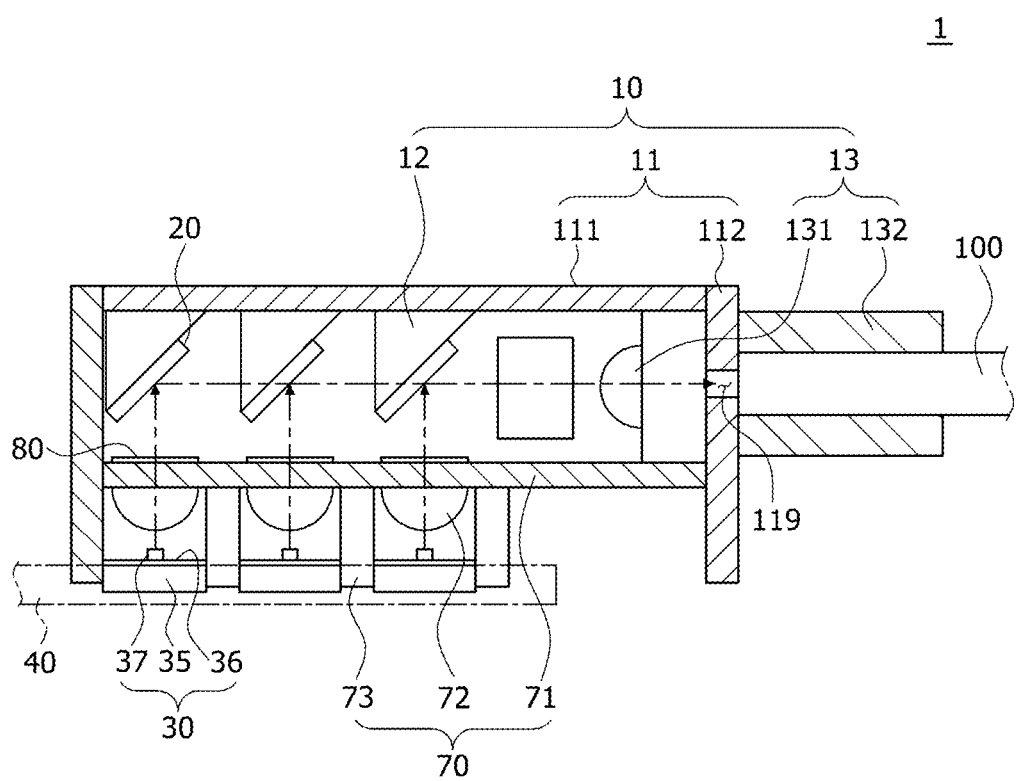
FIG. 3 is a schematic side view illustrating the multiwavelength optical sub-assembly module according to one embodiment of the present invention.

FIG. 1 is a schematic perspective view illustrating a multiwavelength optical sub-assembly module according to one embodiment of the present invention, FIG. 2 is a schematic plan view illustrating the multiwavelength optical sub-assembly module according to one embodiment of the present invention, and FIG. 3 is a schematic side view illustrating the multiwavelength optical sub-assembly module according to one embodiment of the present invention.

Figure 4:
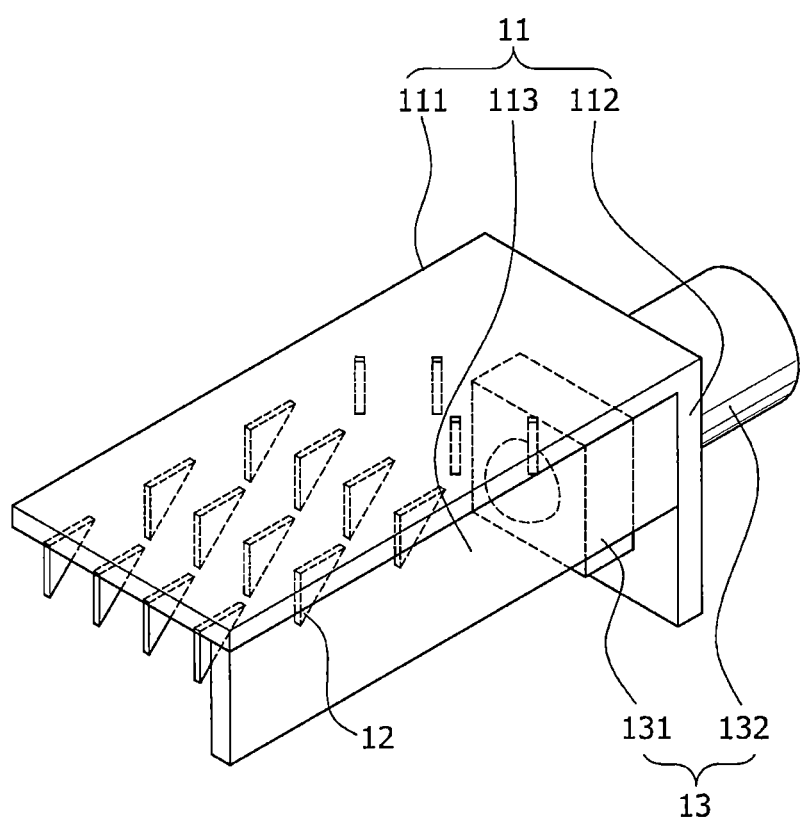
FIG. 4 is a schematic perspective view illustrating a housing of the multiwavelength optical sub-assembly module according to one embodiment of the present invention.
Figure 5:
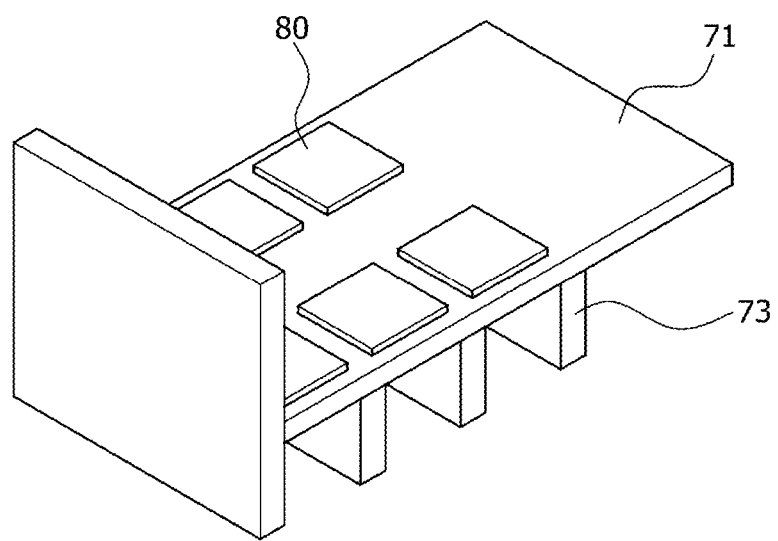
FIG. 5 is a schematic view illustrating an optical arrangement unit of the multiwavelength optical sub-assembly module according to one embodiment of the present invention.
Figure 6:
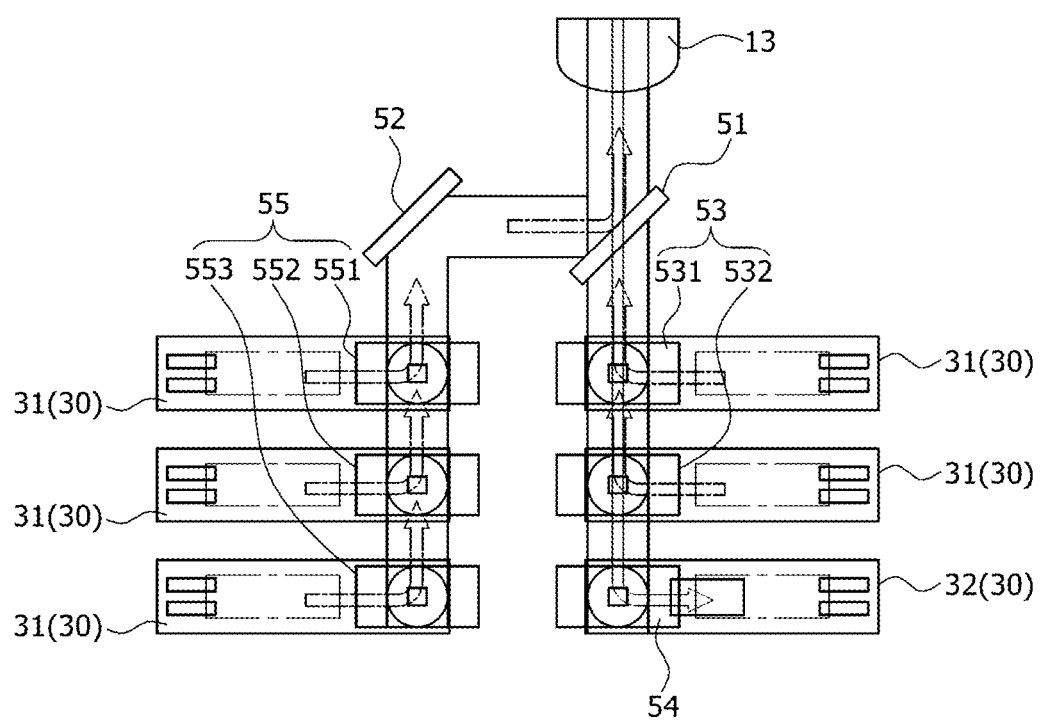
FIG. 6 is a schematic view illustrating an arrangement of an optical filter unit for optical transmission in the multiwavelength optical sub-assembly module according to one embodiment of the present invention.
Figure 7:
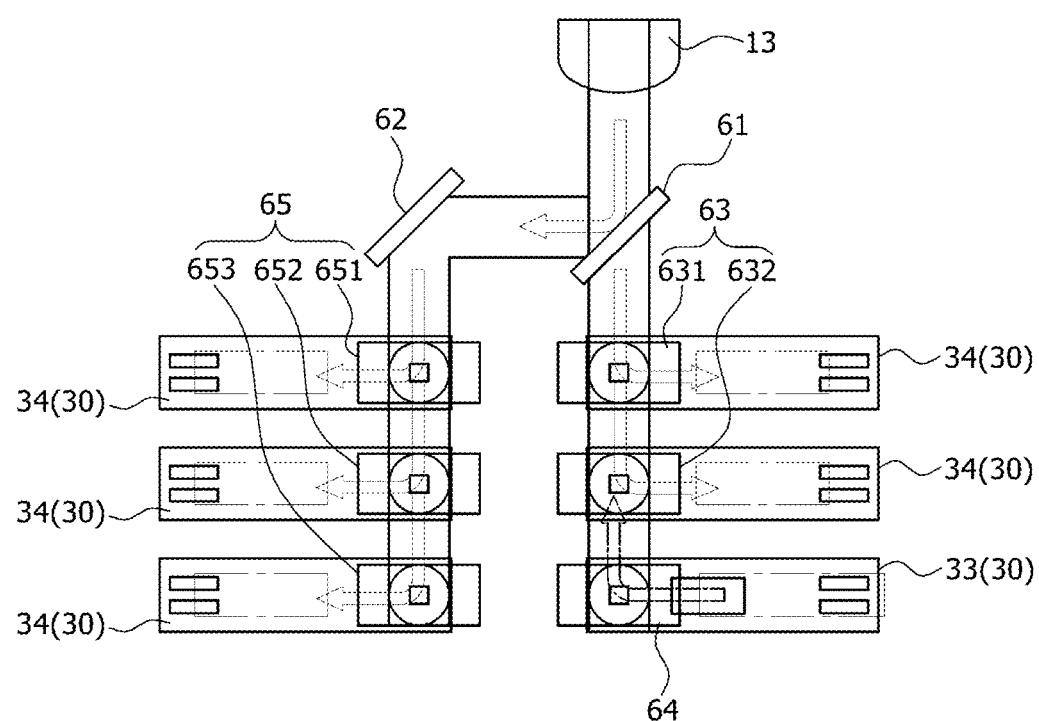
FIG. 7 is a schematic view illustrating an arrangement of an optical filter unit for optical reception in the multiwavelength optical sub-assembly module according to one embodiment of the present invention.

FIG. 4 is a schematic perspective view illustrating a housing of the multiwavelength optical sub-assembly module according to one embodiment of the present invention, FIG. 5 is a schematic view illustrating an optical arrangement unit of the multiwavelength optical sub-assembly module according to one embodiment of the present invention, FIG. 6 is a schematic view illustrating an arrangement of an optical filter unit for optical transmission in the multiwavelength optical sub-assembly module according to one embodiment of the present invention, and FIG. 7 is a schematic view illustrating an arrangement of an optical filter unit for optical reception in the multiwavelength optical sub-assembly module according to one embodiment of the present invention.

Figure 8:
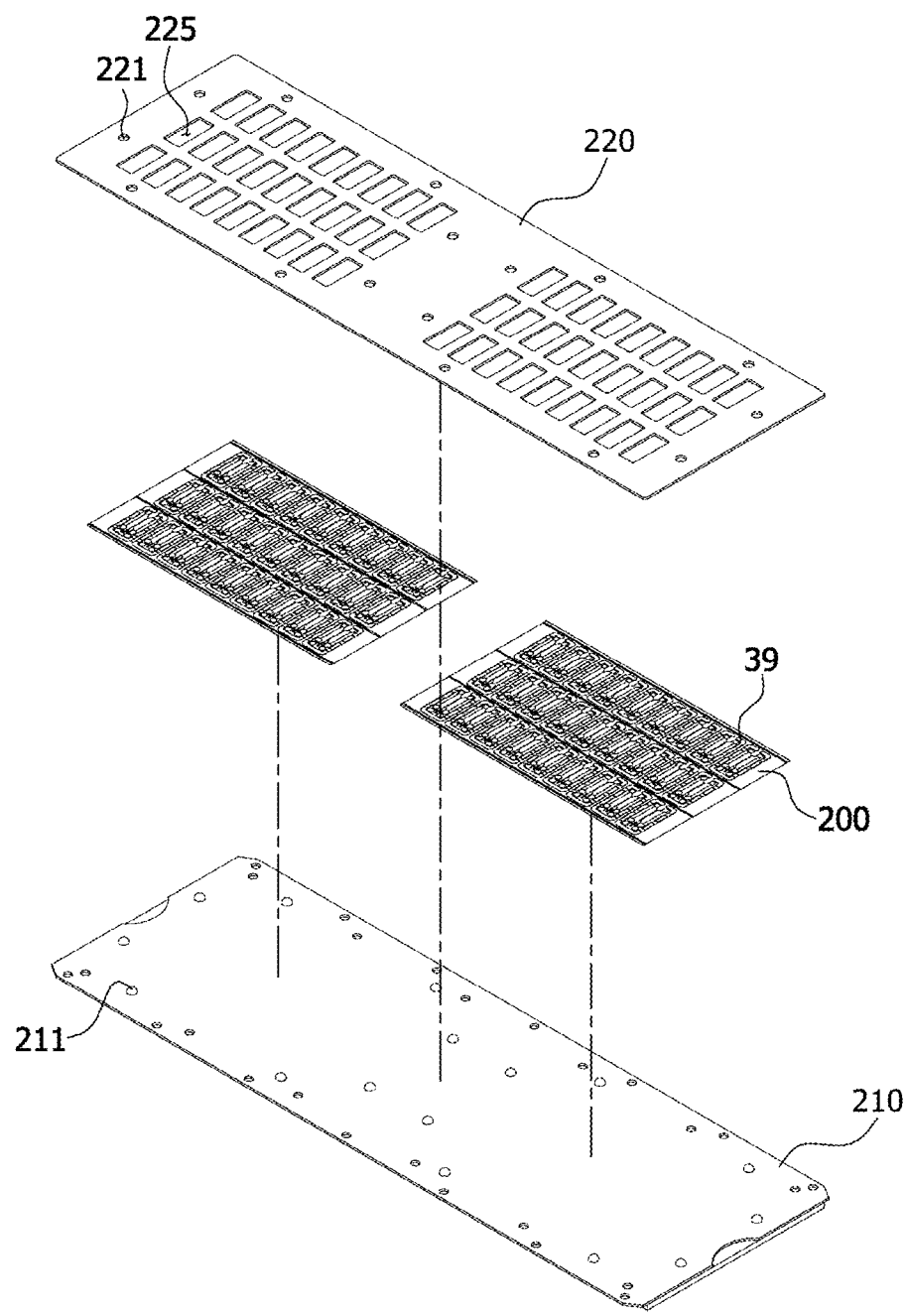
FIG. 8 is a schematic exploded perspective view illustrating a state in which a transceiver unit is arranged in the multiwavelength optical sub-assembly module according to one embodiment of the present invention.
Figure 9:
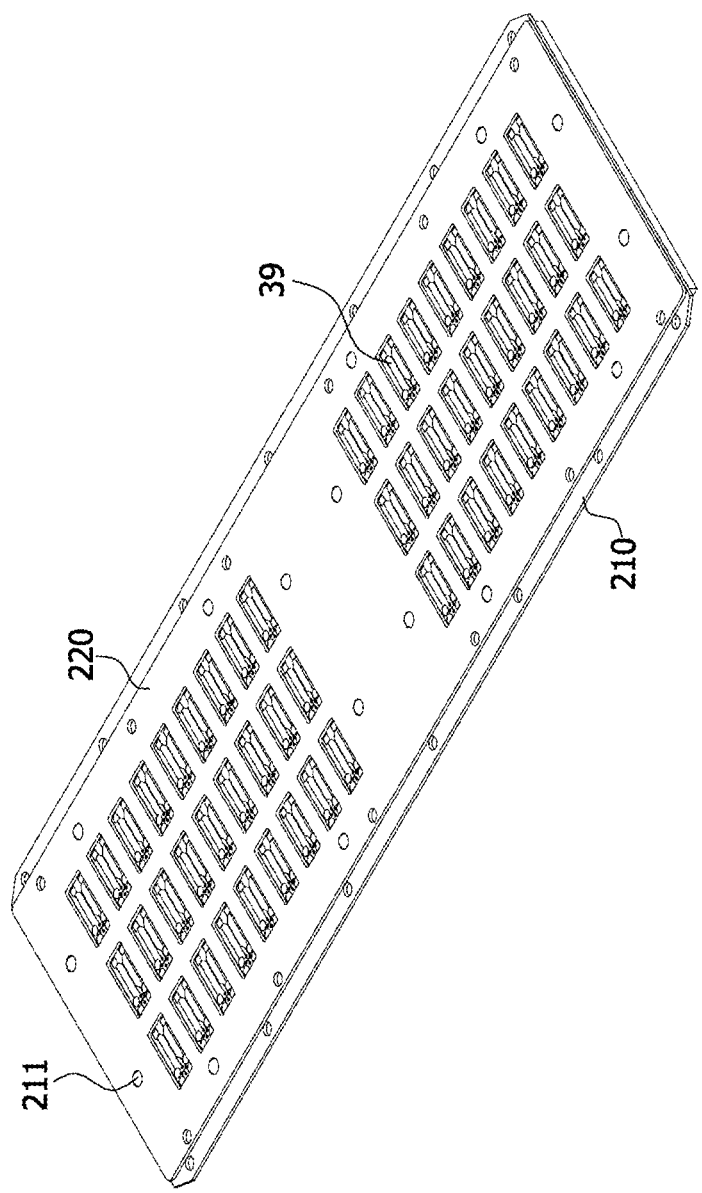
FIG. 9 is a schematic coupled perspective view illustrating a state in which the transceiver unit is arranged in the multiwavelength optical sub-assembly module according to one embodiment of the present invention.

FIG. 8 is a schematic exploded perspective view illustrating a state in which a transceiver unit is arranged in the multiwavelength optical sub-assembly module according to one embodiment of the present invention, and FIG. 9 is a schematic coupled perspective view illustrating a state in which the transceiver unit is arranged in the multiwavelength optical sub-assembly module according to one embodiment of the present invention.

Figure 10:
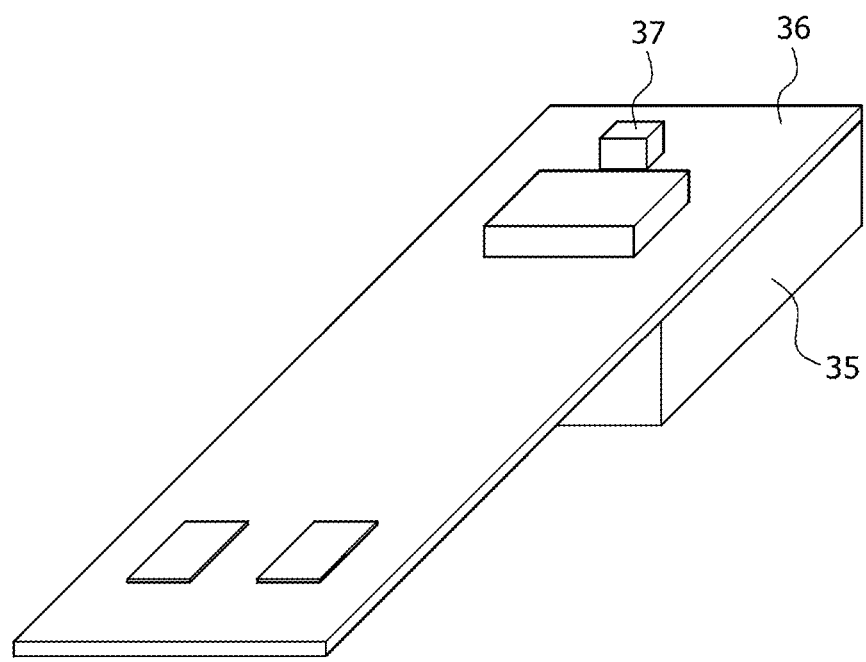
FIG. 10 is a schematic view illustrating a state in which an optical device is mounted on the transceiver unit in the multiwavelength optical sub-assembly module according to one embodiment of the present invention.
Figure 11:
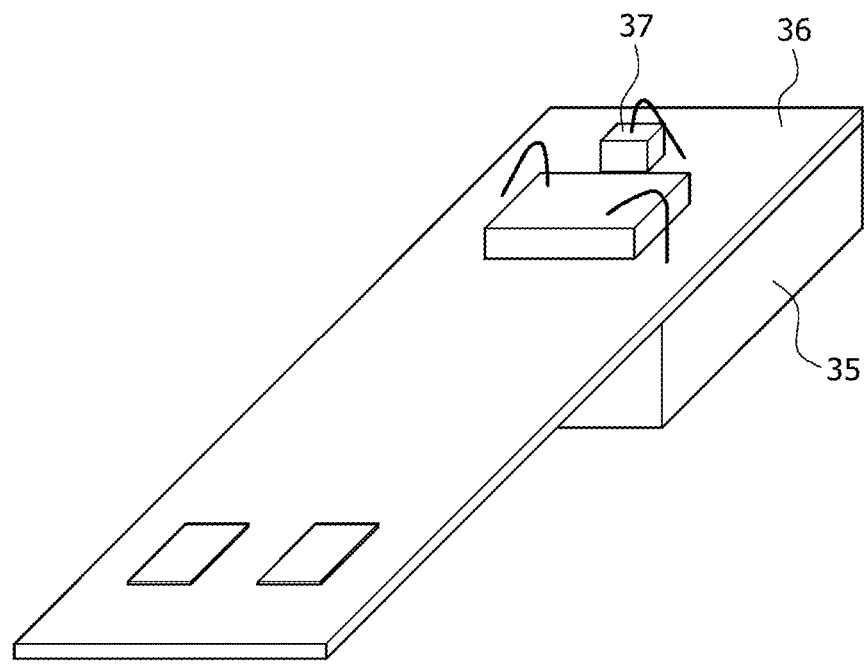
FIG. 11 is a schematic view illustrating a state in which the optical device mounted on the transceiver unit is wire-bonded in the multiwavelength optical sub-assembly module according to one embodiment of the present invention.
Figure 12:
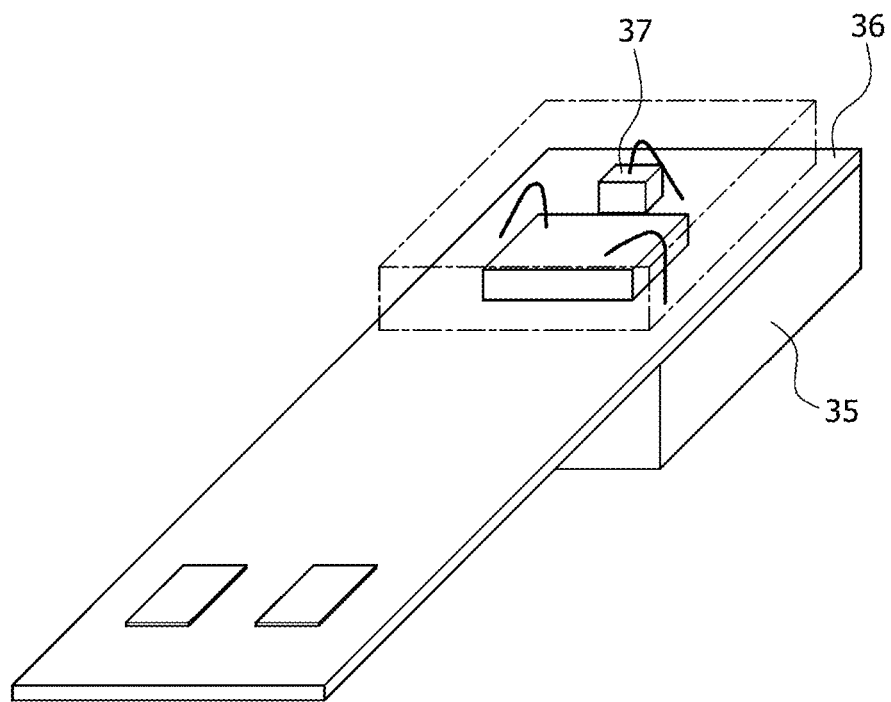
FIG. 12 is a schematic view illustrating a state in which the optical device mounted on the transceiver unit is covered by epoxy in the multiwavelength optical sub-assembly module according to one embodiment of the present invention.

FIG. 10 is a schematic view illustrating a state in which an optical device is mounted on the transceiver unit in the multiwavelength optical sub-assembly module according to one embodiment of the present invention, FIG. 11 is a schematic view illustrating a state in which the optical device mounted on the transceiver unit is wire-bonded in the multiwavelength optical sub-assembly module according to one embodiment of the present invention, and FIG. 12 is a schematic view illustrating a state in which the optical device mounted on the transceiver unit is covered by epoxy in the multiwavelength optical sub-assembly module according to one embodiment of the present invention.

Referring to FIGS. 1 to 3, a multiwavelength optical sub-assembly module 1 includes a housing 10, optical filter units 20, transceiver units 30, and a substrate 40.

The housing 10 is connected to an optical cable 100, and the optical filter units 20 are coupled to the housing 10 and guide optical signals.

The transceiver units 30 are coupled to the housing 10 and transceive optical signals. Such transceiver units are provided in plurality.

The transceiver units 30 receive optical signals reflected by the optical filter units 20. In addition, the transceiver units 30 transmits the optical signals to the optical filter units 20, and the optical filter units 20 reflect the optical signals in set directions.

For example, when the multiwavelength optical sub-assembly module 1 is connected to a computer, an image signal, an audio signal, and a control signal are transmitted, and a state signal of a monitor is received.

In addition, when the multiwavelength optical sub-assembly module 1 is connected to the monitor, an image signal, an audio signal, and a control signal are received, and a state signal of the monitor is transmitted.

A plurality of transceiver units 30 are provided to individually transceive optical signals having wavelength bands different from each other.

Each of the plurality of transceiver units 30 is connected to the substrate 40. The substrate 40 is provided with a substrate of a rigid material and a substrate of a flexible material, and circuits and devices are formed thereon to control the transceiver units 30.

Referring to FIGS. 1 to 4, the housing 10 according to one embodiment of the present invention includes a body unit 11, filter installation units 12, and a lens unit 13. The housing 10 includes a plastic material and is integrally formed.

For example, the body unit 11 includes a top plate 111 and a side plate 112 extending downward from one end of the top plate 111. In addition, the body unit 11 includes a side wall 113 extending downward from a side end of the top plate 111.

The body unit 11 forms a frame of the housing 10, and the filter installation units 12 are formed on the body unit 11. The number of the filter installation units 12 corresponds to the optical filter units 20 such that a plurality of optical filter units 20 are installed on the filter installation units 12.

In addition, the filter installation units 12 support the optical filter units 20 and have a shape or a material property that do not interfere with optical signals.

For example, a pair of filter installation units 12 protrude from a bottom surface of the top plate 111, and an edge of one optical filter unit 20 is coupled to the filter installation unit 12.

The filter installation units 12 have a shape in which the centers are open to pass an optical signal in addition to protruding from the bottom surface of the top plate 111.

Meanwhile, the optical filter unit 20 is disposed above the transceiver unit 30 and guides an optical signal having a set wavelength band. Here, the filter installation unit 12 on which the optical filter unit 20 is installed may have a cross-section in a triangular shape to reflect an optical signal.

The lens unit 13 is formed at the body unit 11 and arranges an optical signal transceived through the optical cable 100.

For example, the lens unit 13 includes a lens 131 that is formed at an inner side of the side plate 112 and arranges an optical signal and a connection pipe 132 formed at an outer side of the side plate 131 and connected to the optical cable 100.

Here, an optical signal arranged by the lens 131 or guided through the optical cable 100 passes through a side plate hole 119 formed in the side plate 112.

Referring to FIGS. 2, 3, and 6, the optical filter unit 20 according to one embodiment of the present invention includes a lens light guide unit 51 for transmission, an optical reflection unit 52 for transmission, a long wavelength guide unit 53 for transmission, a receiving guide unit 54 for transmission, and a short wavelength guide unit 55 for transmission. The multiwavelength optical sub-assembly module 1 including such optical filter unit 20 may be connected to a computer that transmits an optical signal.

The lens light guide unit 51 for transmission is disposed on a straight line with the lens unit 13. The lens light guide unit 51 for transmission passes an optical signal having a set wavelength or more and reflects an optical signal having a wavelength less than the set wavelength, to guide the optical signal to the lens unit 13.

The optical reflection unit 52 for transmission is disposed to face the lens light guide unit 51 for transmission and reflects an optical signal to guide the optical signal to the lens light guide unit 51 for transmission. Since the optical reflection unit 52 for transmission need not pass optical signals for each wavelength, the optical reflection unit 52 for transmission may be substituted with a mirror that reflects the optical signal itself.

The long wavelength guide unit 53 for transmission is disposed on a straight line with the lens light guide unit 51 for transmission. The long wavelength guide unit 53 for transmission guides an optical signal generated by the transceiver unit 30 to the lens light guide unit 51 for transmission.

The receiving guide unit 54 for transmission is disposed on a straight line with the lens light guide unit 51 for transmission and guides an optical signal passing through the long wavelength guide unit 53 for transmission to the transceiver unit 30.

The short wavelength guide unit 55 for transmission is disposed on a straight line with the optical reflection unit 52 for transmission and guides an optical signal generated by the transceiver unit 30 to the optical reflection unit 52 for transmission.

The short wavelength guide unit 55 for transmission includes three short wavelength guide units for transmission and reflects an optical signal having a wavelength that is shorter with increasing distance from the optical reflection unit 52 for transmission.

For example, in the short wavelength guide unit 55 for transmission, a first short wavelength reflector 551 for transmission, a second short wavelength reflector 552 for transmission, and a third short wavelength reflector 553 for transmission are sequentially disposed corresponding to increasing distance from the optical reflection unit 52 for transmission.

The first short wavelength reflector 551 for transmission reflects an optical signal having a wavelength of 870 nm to guide the optical signal to the optical reflection unit 52 for transmission.

The second short wavelength reflector 552 for transmission reflects an optical signal having a wavelength of 825 nm to guide the optical signal to the optical reflection unit 52 for transmission. Here, the optical signal having the wavelength of 825 nm passes through the first short wavelength reflector 551 for transmission.

The third short wavelength reflector 553 for transmission reflects an optical signal having a wavelength of 780 nm to guide the optical signal to the optical reflection unit 52 for transmission. Here, the optical signal having the wavelength of 780 nm sequentially passes through the second short wavelength reflector 552 for transmission and the first short wavelength reflector 551 for transmission.

Since the third short wavelength reflector 553 for transmission need not pass optical signals for each wavelength, the third short wavelength reflector 553 for transmission may be substituted with a mirror that reflects the optical signal itself.

The long wavelength guide unit 53 for transmission includes two long wavelength guide units for transmission, and reflects an optical signal having a wavelength that is longer with increasing distance from the lens light guide unit 51 for transmission.

For example, in the long wavelength guide unit 53 for transmission, a first long wavelength reflector 531 for transmission and a second long wavelength reflector 532 for transmission are sequentially disposed corresponding to the distance from the lens light guide unit 51 for transmission.

The first long wavelength reflector 531 for transmission reflects an optical signal having a wavelength of 915 nm to guide the optical signal to the lens light guide unit 51 for transmission.

The second long wavelength reflector 532 for transmission reflects an optical signal having a wavelength of 960 nm to guide the optical signal to the lens light guide unit 51 for transmission. Here, the optical signal having the wavelength of 960 nm passes through the first long wavelength reflector 531 for transmission.

Meanwhile, the long wavelength guide unit 53 for transmission is disposed between the receiving guide unit 54 for transmission and the lens light guide unit 51 for transmission.

For example, the first long wavelength reflector 531 for transmission, the second long wavelength reflector 532 for transmission, and the receiving guide unit 54 for transmission are sequentially disposed.

The receiving guide unit 54 for transmission reflects an optical signal having a wavelength of 1005 nm to guide the optical signal transceiver unit 30. Here, the optical signal having the wavelength of 1005 nm passes through the first long wavelength reflector 531 for transmission and the second long wavelength reflector 532 for transmission.

Since the receiving guide unit 54 for transmission need not pass optical signals for each wavelength, the receiving guide unit 54 for transmission may be substituted with a mirror that reflects the optical signal itself.

The transceiver unit 30 includes optical transmission units 31 for transmission and an optical receiving unit 32 for transmission.

Each of the optical transmission units 31 for transmission are disposed below each of the short wavelength guide unit 55 for transmission and the long wavelength guide unit 53 for transmission and generates optical signals having wavelength bands different from each other. In addition, the optical receiving unit 32 for transmission is disposed below the receiving guide unit 54 for transmission.

For example, the optical transmission unit 31 for transmission disposed below the first short wavelength reflector 551 for transmission generates an optical signal having a wavelength of 870 nm, the optical transmission unit 31 for transmission disposed below the second short wavelength reflector 552 for transmission generates an optical signal having a wavelength of 825 nm, and the optical transmission unit 31 for transmission disposed below the third short wavelength reflector 553 for transmission generates an optical signal having a wavelength of 780 nm.

The optical transmission unit 31 for transmission disposed below the first long wavelength reflector 531 for transmission generates an optical signal having a wavelength of 915 nm, and the optical transmission unit 31 for transmission disposed below the second long wavelength reflector 532 for transmission generates an optical signal having a wavelength of 960 nm.

Meanwhile, the optical receiving unit 32 for transmission disposed below the receiving guide unit 54 for transmission receives an optical signal having a wavelength of 1005 nm.

Referring to FIGS. 2, 3, and FIG. 7, the optical filter unit 20 according to one embodiment of the present invention includes a lens light guide unit 61 for reception, an optical reflection unit 62 for reception, a long wavelength guide unit 63 for reception, a transmission guide unit 64 for reception, and a short wavelength guide unit 65 for reception. The multiwavelength optical sub-assembly module 1 including the optical filter unit 20 may be connected to a monitor that receives an optical signal.

The lens light guide unit 61 for reception and the lens unit 13 are disposed on a straight line. The lens light guide unit 61 for reception passes an optical signal having a set wavelength or more and reflects an optical signal having a wavelength less than the set wavelength to guide the optical signal to the optical reflection unit 62 for reception.

The optical reflection unit 62 for reception is disposed to face the lens light guide unit 61 for reception and reflects an optical signal guided by the optical signal to the lens light guide unit 61 for reception to guide the optical signal to the short wavelength guide unit 65 for reception.

Since the optical reflection unit 62 for reception need not pass optical signals for each wavelength, the optical reflection unit 62 for reception may be substituted with a mirror that reflects the optical signal itself.

The long wavelength guide unit 63 for reception is disposed on a straight line with the lens light guide unit 61 for reception. The long wavelength guide unit 63 for reception guides an optical signal passing through the lens light guide unit 61 for reception to the transceiver unit 30.

The transmission guide unit 64 for reception is disposed on a straight line with the lens light guide unit 61 for reception and guides an optical signal generated by the transceiver unit 30 to the lens light guide unit 61 for reception. Here, an optical signal reflected by the transmission guide unit 64 for reception passes through the long wavelength guide unit 63 for reception and reaches the lens light guide unit 61 for reception.

The short wavelength guide unit 65 for reception is disposed on a straight line with the optical reflection unit 62 for reception and guides an optical signal reflected by the optical reflection unit 62 for reception to the transceiver unit 30.

The short wavelength guide unit 65 for reception includes three short wavelength guide units for reception and reflects an optical signal having a wavelength that is shorter with increasing distance from the optical reflection unit 62 for reception.

For example, in the short wavelength guide unit 65 for reception, a first short wavelength reflector 651 for reception, a second short wavelength reflector 652 for reception, and a third short wavelength reflector 653 for reception are sequentially disposed corresponding to increasing distance from an optical reflection unit 62 for reception.

The first short wavelength reflector 651 for reception reflects an optical signal having a wavelength of 870 nm to guide the optical signal to the transceiver unit 30. The first short wavelength reflector 651 for reception passes an optical signal having a wavelength less than 870 nm.

The second short wavelength reflector 652 for reception reflects an optical signal having a wavelength of 825 nm to guide the optical signal to the transceiver unit 30. The second short wavelength reflector 652 for reception passes an optical signal having a wavelength less than 825 nm.

The third short wavelength reflector 653 for reception reflects an optical signal having a wavelength of 780 nm to guide the optical signal to the transceiver unit 30. Since the third short wavelength reflector 653 for reception need not pass optical signals for each wavelength, the third short wavelength reflector 653 for reception may be substituted with a mirror that reflects the optical signal itself.

The long wavelength guide unit 63 for reception includes two long wavelength reflectors for reception and reflects an optical signal having a wavelength that is longer with increasing distance from the lens light guide unit 61 for reception.

For example, in the long wavelength guide unit 63 for reception, a first long wavelength reflector 631 for reception and a second long wavelength reflector 632 for reception are sequentially disposed corresponding to increasing distance from the lens light guide unit 61 for reception.

The first long wavelength reflector 631 for reception reflects an optical signal having a wavelength of 915 nm to guide the optical signal to the transceiver unit 30. The first long wavelength reflector 631 for reception passes an optical signal having a wavelength greater than 915 nm.

The second long wavelength reflector 632 for reception reflects an optical signal having a wavelength of 960 nm to guide the optical signal to the transceiver unit 30. The second long wavelength reflector 632 for reception passes an optical signal having a wavelength greater than 960 nm.

Meanwhile, the long wavelength guide unit 63 for reception is disposed between the transmission guide unit 64 for reception and the lens light guide unit 61 for reception.

For example, the first long wavelength reflector 631 for reception, the second long wavelength reflector 632 for reception, and the transmission guide unit 64 for reception are sequentially disposed.

The transmission guide unit 64 for reception reflects an optical signal having a wavelength of 1005 nm to guide the optical signal to the lens light guide unit for reception. Here, an optical signal having a wavelength of 1005 nm passes through the first long wavelength reflector 631 for reception and the second long wavelength reflector 632 for reception.

Since the transmission guide unit 64 for reception need not pass optical signals for each wavelength, the transmission guide unit 64 for reception may be substituted with a mirror that reflects the optical signal itself.

The transceiver unit 30 includes an optical transmission unit 33 for reception and optical receiving units 34 for reception.

Each of the optical receiving units 34 for reception are disposed below each of the short wavelength guide unit 65 for reception and the long wavelength guide unit 63 for reception and receives an optical signal having a distinct wavelength band.

In addition, the optical transmission unit 33 for reception is disposed below the transmission guide unit 64 for reception and generates an optical signal.

For example, the optical receiving unit 34 for reception disposed below the first short wavelength reflector 651 for reception receives an optical signal having a wavelength of 870 nm, the optical receiving unit 34 for reception disposed below the second short wavelength reflector 652 for reception receives an optical signal having a wavelength of 825 nm, and the optical receiving unit 34 for reception disposed below the third short wavelength reflector 653 for reception receives an optical signal having a wavelength of 780 nm.

The optical receiving unit 34 for reception disposed below the first long wavelength reflector 631 for reception receives an optical signal having a wavelength of 915 nm, and the optical receiving unit 34 for reception disposed below the second long wavelength reflector 632 for reception receives an optical signal having a wavelength of 960 nm. Meanwhile, the optical transmission unit 33 for reception disposed below the transmission guide unit 64 for reception receives an optical signal having a wavelength of 1005 nm.

Referring to FIGS. 3 and 5, the multiwavelength optical sub-assembly module according to one embodiment of the present invention includes optical arrangement units 70.

The optical arrangement units 70 are coupled to the housing 10 and disposed between the optical filter units 20 and the transceiver units 30 and arrange optical signals.

Each of the optical arrangement units 70 according to one embodiment of the present invention includes an optical arrangement body 71, an optical arrangement lens 72, and an optical arrangement coupling portion 73.

The optical arrangement units 70 are formed of a plastic material and integrally formed. In addition, the optical arrangement units 70 may be formed of various materials through which an optical signal may pass.

The optical arrangement body 71 is coupled to the housing 10. For example, the optical arrangement body 71 has a plate shape parallel to the top plat 111 and is fixed to the top plat 111 through a thermal curing process after being manually assembled to the top plat 111 through an ultraviolet (UV) curing process.

The optical arrangement lens 72 is formed on the optical arrangement body 71 and arranges an optical signal passing between the optical filter unit 20 and the transceiver unit 30. The optical arrangement lens 72 is disposed on a line perpendicular to each of the transceiver units 30.

The optical arrangement coupling portion 73 is formed on the optical arrangement body 71 to protrude downward from the optical arrangement body 71. The optical arrangement coupling portion 73 is disposed between the optical arrangement lenses 72 and is coupled to the transceiver unit 30.

The transceiver unit 30 is temporarily fixed to the optical arrangement coupling portion 73 through a UV curing process after an optical arrangement test process is completed and is completely fixed to the optical arrangement coupling portion 73 by a thermally cured epoxy.

Referring to FIGS. 3, and 8 to 12, the transceiver unit 30 according to one embodiment of the present invention includes a the rigid board 35, a flexible board 36, and an optical device 37.

The rigid board 35 is formed of a rigid material and coupled to the optical arrangement coupling portion 73. The flexible board 36 is coupled to the rigid board 35 and connected to the substrate 40. The optical device 37 is mounted on the flexible board 36 and receives an optical signal.

Meanwhile, the transceiver units 30 are manufactured on a matrix-type board in which a plurality of boards are integrated.

That is, in order to manufacture the transceiver unit 30 according to one embodiment of the present invention, printed circuit boards (PCBs) 39 in which the rigid board 35 and the flexible board 36 are integrated are arranged, and a method of arranging the PCBs 39 will be described below (see FIGS. 8 and 9).

First, substrate bundle units 200 in which a plurality of PCBs 39 are divided are seated on a seating plate 210.

Here, the PCBs 39 having the same shape are arranged on the substrate bundle unit 200 in a column and a row. In addition, a region is formed on the seating plate 210 to seat the substrate bundle units 200, and fixing protrusions 211 protrudes upward from the seating plate 210.

After the substrate bundle units 200 are seated on the seating plate 210, a fixing plate 220 is stacked on the seating plate 210. When the fixing plate 220 presses the substrate bundle unit 200, movement of the substrate bundle unit 200 is restricted by the weight of the fixing plate 220.

Here, open holes 225 are formed in the fixing plate 220 such that the PCBs 39 are exposed to the outside and an installation process in which the optical device 37 is mounted on the PCBs 39 is performed, and fixing holes 221 are formed in the fixing plate 220 into which the fixing protrusions 221 are inserted to restrict movement of the fixing plate 220.

When the substrate bundle units 200 are disposed between the seating plate 210 and the fixing plate 220, the substrate bundle units 200, the seating plate 210, and the fixing plate 220 move along an installation process line of the optical device 37.

In the installation process line of the optical device 37, the optical device 37 is mounted on each of the PCBs 39, the optical device 37 is wire-bonded (see FIG. 11), and the optical device 37 is covered using an epoxy (see FIG. 12) by an automatic apparatus.

When the optical device 37 is mounted on each of PCBs 39 by the automatic apparatus, the individual transceiver unit 30 is obtained by cutting the substrate bundle units 200 to separate each of the PCBs 39.

Meanwhile, the rigid board 35 to be coupled to the optical arrangement coupling portion 73 is formed of a rigid material that may not easily bend, and the flexible board 36 is formed of a flexible material that may easily bend.

Here, the rigid board 35 is mounted on a bottom surface of the flexible board 36 to form one single part, and the flexible board 36 and the rigid board 35 may be connected to transceive an electrical signal.

In addition, the optical device 37 is classified either as a light emitting device or a light receiving device and accordingly mounted on the transceiver unit 30. Because the optical device 37 is screened through a screen test for whether a defect occurs on a critical condition, reliability evaluation of the optical device 37 is possible.

For example, when the light emitting device is mounted on the transceiver unit 30, the transceiver unit 30 generates an optical signal. In addition, when the light receiving device is mounted on the transceiver unit 30, the transceiver unit 30 receives an optical signal.

When both of the light emitting device and the light receiving device are mounted on the transceiver unit 30, the multiwavelength optical sub-assembly module 1 may be used in a mixed way for transmitting or receiving an optical signal.

Referring to FIG. 3, the multiwavelength optical sub-assembly module 1 according to one embodiment of the present invention further includes screening filter units 80. The screening filter units 80 may prevent an optical signal having a wavelength band different from a set wavelength band from being introduced to the light receiving device which receives an optical signal having the set wavelength band.

The screening filter unit 80 disposed between the optical filter unit 20 and the transceiver unit 30 passes only an optical signal having a selected wavelength. The screening filter unit 80 prevents optical signal interference by screening optical signals having undesired wavelength bands.

For example, the screening filter unit 80 may be disposed between the optical filter unit 20 and the optical arrangement unit 70. Here, the screening filter unit 80 is coupled to an upper side of the optical arrangement unit 70 and disposed on a line perpendicular to the optical arrangement lens 72.

Meanwhile, the screening filter unit 80 may be disposed between the optical arrangement unit 70 and the transceiver unit 30. Here, the screening filter unit 80 is coupled to a lower side of the optical arrangement unit 70 and disposed on a line perpendicular to the optical arrangement lens 72. In addition, the screening filter unit 80 may be coupled to the housing 10.

A function of the multiwavelength optical sub-assembly module having the above-described structure according to one embodiment of the present invention will be described below.

The multiwavelength optical sub-assembly module 1 is installed at each end of the cable 100 that is a single optical fiber.

The multiwavelength optical sub-assembly module 1 includes the plurality of transceiver units 30 and the plurality of optical filter units 20 that guide optical signals at positions corresponding to the transceiver units 30.

Here, reliability evaluation of the optical device 37 to be mounted on the transceiver unit 30 is performed.

Meanwhile, an operation of the multiwavelength sub-assembly module 1 to be connected to an image transmission apparatus, such as a computer, will be described below.

Five optical transmission units 31 for transmission having wavelength bands different from each other and one optical receiving unit 32 for transmission are coupled to the optical arrangement coupling portion 73. Here, after each of the optical transmission units 31 for transmission and the optical receiving unit 32 for transmission each having a defect is individually replaced through an optical arrangement operation and each of the optical transmission units 31 for transmission and the optical receiving unit 32 for transmission is coupled to the optical arrangement coupling portion 73.

Wavelength bands of optical signals guided by two optical transmission units 31 for transmission disposed on the same line with the lens light guide unit 51 for transmission and one optical receiving unit 32 for transmission are greater than that of an optical signal guided by three optical transmission units 31 for transmission disposed on the same line with the optical reflection unit 52 for transmission.

In the above state, an optical signal having a wavelength of 780 nm is reflected by the third short wavelength reflector 553 for transmission and passes through the second short wavelength reflector 552 for transmission and the first short wavelength reflector 551 for transmission.

In addition, the optical signal is reflected by the optical reflection unit 52 for transmission, is reflected by the lens light guide unit 51 for transmission, and is moved to the lens unit 13 (see FIG. 6).

An optical signal having a wavelength of 825 nm is reflected by the second short wavelength reflector 552 for transmission and passes through the first short wavelength reflector 551 for transmission.

In addition, the optical signal is reflected by the optical reflection unit 52 for transmission, is reflected by the lens light guide unit 51 for transmission, and is moved to the lens unit 13.

An optical signal having a wavelength of 870 nm is reflected by the first short wavelength reflector 551 for transmission and is reflected by the optical reflection unit 52 for transmission. In addition, the optical signal is reflected by the lens light guide unit 51 for transmission and is moved to the lens unit 13.

An optical signal having a wavelength of 915 nm is reflected by the first long wavelength reflector 531 for transmission, passes through the lens light guide unit 51 for transmission, and is moved to the lens unit 13.

An optical signal having a wavelength of 960 nm is reflected by the second long wavelength reflector 532 for transmission, passes through the first long wavelength reflector 531 for transmission and the lens light guide unit 51 for transmission, and is moved to the lens unit 13.

In addition, an optical signal transmitted from an image receiving apparatus and having a wavelength of 1005 nm sequentially passes through the lens light guide unit 51 for transmission, the first long wavelength reflector 531 for transmission, and the second long wavelength reflector 532 for transmission, is reflected by the receiving guide unit 54 for transmission, and is guided to the optical receiving unit 32 for transmission.

Here, the optical signals generated by the optical transmission units 31 for transmission refer to image, audio, and control signals for implementing red, green, and blue colors, and an optical signal received by the optical receiving unit 32 for transmission refers to a state signal of the image receiving apparatus.

Meanwhile, an operation of the multiwavelength sub-assembly module 1 to be connected to an image transmission apparatus, such as a monitor, will be described below.

Five optical receiving units 34 for reception having wavelength bands different from each other and one optical transmission unit 33 for reception are coupled to the optical arrangement coupling portion 73. Here, after each of the optical receiving units 34 for reception and the optical transmission unit 33 for reception having a defect is individually replaced through an optical arrangement operation, each of the optical receiving units 34 for reception and the optical transmission unit 33 for reception is coupled to the optical arrangement coupling portion 73.

Wavelength bands of optical signals guided by two optical receiving units 34 for reception and one optical transmission unit 33 for reception disposed on the same line with the lens light guide unit 61 for reception are greater than that of optical signals guided by three optical receiving units 34 for reception disposed on the same line with the optical reflection unit 62 for reception.

In the above state, an optical signal having a wavelength of 780 nm is reflected by the lens light guide unit 61 for reception, is guided to the optical reflection unit 62 for reception, and is reflected by the optical reflection unit 62 for reception.

In addition, the optical signal passes through the first short wavelength reflector 651 for reception and the second short wavelength reflector 652 for reception, is reflected by the third short wavelength reflector 653 for reception, and is moved to the optical receiving unit 34 for reception (see FIG. 7).

An optical signal having a wavelength of 825 nm is reflected by the lens light guide unit 61 for reception, is guided to the optical reflection unit 62 for reception, and is reflected by the optical reflection unit 62 for reception.

In addition, the optical signal passes through the first short wavelength reflector 651 for reception, is reflected by the second short wavelength reflector 652 for reception, and is moved to the optical receiving unit 34 for reception.

An optical signal having a wavelength of 870 nm is reflected by the lens light guide unit 61 for reception, is guided to the optical reflection unit 62 for reception, and is reflected by the optical reflection unit 62 for reception.

In addition, the optical signal is reflected by the first short wavelength reflector 651 for reception and is moved to the optical receiving unit 34 for reception.

An optical signal having a wavelength of 915 nm passes through the lens light guide unit 61 for reception, is reflected by the first long wavelength reflector 631 for reception, and is moved to the optical receiving unit 34 for reception.

An optical signal having a wavelength of 960 nm sequentially passes through the lens light guide unit 61 for reception and the first long wavelength reflector 631 for reception, is reflected by the second long wavelength reflector 632 for reception, and is moved to the optical receiving unit 34 for reception.

In addition, an optical signal which will be transmitted to an image transmission apparatus and has a wavelength of 1005 nm is reflected by the transmission guide unit 64 for reception, sequentially passes through the second long wavelength reflector 632 for reception, the first long wavelength reflector 631 for reception, and the lens light guide unit 61 for reception, and is moved to lens unit 13.

Here, the optical signals received by the optical receiving units 34 for reception refer to image, audio, and control signals for implementing red, green, and blue colors, and the optical signal generated by the optical transmission unit 33 for reception refers to a state signal of the image receiving apparatus.

Meanwhile, a plurality of optical signals having wavelengths different from each other are not interfered with each other even when moving through the single cable 100. In addition, the optical arrangement units 70 are disposed between the optical filter units 20 and the transceiver units 30 and are optically arranged. The screening filter units 80 are disposed between the optical filter units and the transceiver units 30 and filter unselected optical signals.

Accordingly, in the present invention, the plurality of transceiver units 30 can transceive optical signals having wavelength bands different from each other, and thus transmission of the optical signals can be easily performed through a single cable 100.

In the present invention, since the plurality of transceiver units 30 can be separately installed, when individual defects occur, the plurality of transceiver units 30 can be used after only replacing the defective parts.

In the present invention, since the plurality of transceiver units 30 are separately installed, density of the parts is lowered, and thus overheating may be prevented.

In the present invention, reliability evaluation of the optical device 37 is possible, and thus reliability of a product may be improved.

In the present invention, since an optical signal is doubly optically arranged by the optical arrangement units 70 and the lens unit 13, distortion of the optical signal may be suppressed.

In the present invention, the screening filter units 80 are disposed between the transceiver units 30 and the optical filter units 20, and thus interference between optical signals having wavelengths different from each other can be prevented.

In the present invention, since mass production of the transceiver units 30 is possible in a production line, productivity can be improved, and therefore manufacturing cost can be decreased.

The present invention has been described with reference to the examples illustrated in the drawings, but these are only examples. It will be understood by those skilled in the art that various modifications and equivalent other examples may be made.

Therefore, the scope of the present invention is defined by the appended claims.

The invention claimed is:

1. A multiwavelength optical sub-assembly module comprising:
   a housing to be connected to an optical cable;
   a plurality of optical guide units coupled to the housing and configured to guide optical signals;
   a plurality of transmitter-receiver units coupled to the housing and configured to receive the optical signals through the optical guide units or transmit the optical signals to the optical guide units; and
   a substrate coupled to each of the transmitter-receiver units,
   wherein the housing includes:
   a body unit;
   a plurality of filter installation units formed on the body unit and having the optical guide units installed thereon; and
   a lens unit formed on the body unit and configured to align an optical signal transceived through the optical cable,
   wherein each of the filter installation units is coupled to an edge of each of the optical guide units so as not to interfere with the optical signal,
   wherein each of the optical guide units includes:
   a lens light guide unit for transmission disposed on a straight line with the lens unit and configured to pass an optical signal having a set wavelength or more and to reflect an optical signal having a wavelength less than the set wavelength to guide the optical signal to the lens unit;
   an optical reflection unit for transmission disposed to face the lens light guide unit for transmission and configured to reflect an optical signal and guide the optical signal to the lens light guide unit for transmission;
   a long wavelength guide unit for transmission disposed on a straight line with the lens light guide unit for transmission and configured to guide an optical signal generated by each of the transmitter-receiver units to the lens light guide unit for transmission;
   a receiving guide unit for transmission disposed on a straight line with the lens light guide unit for transmission and configured to guide an optical signal passing through the long wavelength guide unit for transmission to each of the transmitter-receiver units; and
   a short wavelength guide unit for transmission disposed on a straight line with the optical reflection unit for transmission and configured to guide an optical signal generated by each of the transmitter-receiver units to the optical reflection unit for transmission.

2. The multiwavelength optical sub-assembly module of claim 1, wherein:
the short wavelength guide unit for transmission includes three short wavelength guide units for transmission and reflects an optical signal having a wavelength that is shorter with increasing distance from the optical reflection unit for transmission; and
the long wavelength guide unit for transmission includes two long wavelength guide units for transmission and reflects an optical signal having a wavelength that is longer with increasing distance from the lens light guide unit for transmission.

3. The multiwavelength optical sub-assembly module of claim 2, wherein each of the transmitter-receiver units includes:
a plurality of optical transmission units for transmission configured to generate optical signals and transmit the optical signals to each of the short wavelength guide units for transmission and the long wavelength guide units for transmission; and
an optical receiving unit for transmission configured to receive an optical signal reflected by the receiving guide unit for transmission.

4. The multiwavelength optical sub-assembly module of claim 1, further comprising an optical alignment unit coupled to the housing, disposed between each of the optical guide units and each of the transmitter-receiver units, and configured to align the optical signals.

5. The multiwavelength optical sub-assembly module of claim 4, wherein the optical alignment unit includes:
an optical alignment body coupled to the housing;
an optical alignment lens formed on the optical alignment body and configured to align an optical signal passing between each of the optical guide units and each of the transmitter-receiver units; and
an optical alignment coupling portion formed on the optical alignment body and coupled to each of the transmitter-receiver units.

6. The multiwavelength optical sub-assembly module of claim 5, wherein each of the transmitter-receiver units includes:
a rigid board coupled to the optical alignment coupling portion;
a flexible board coupled to the rigid board and connected to the substrate; and
an optical device mounted on the flexible board and configured to transceive an optical signal.

7. The multiwavelength optical sub-assembly module of claim 6, wherein each of the transmitter-receiver units is manufactured on a matrix-type board in which a plurality of boards are integrated.

8. The multiwavelength optical sub-assembly module of claim 1, further comprising a screening filter unit disposed between each of the optical guide units and each of the transmitter-receiver units and configured to pass only an optical signal having a selected wavelength.

9. A multiwavelength optical sub-assembly module comprising:
a housing to be connected to an optical cable;
a plurality of optical guide units coupled to the housing and configured to guide optical signals;
a plurality of transmitter-receiver units coupled to the housing and configured to receive the optical signals through the optical guide units or transmit the optical signals to the optical guide units; and
a substrate coupled to each of the transmitter-receiver units,
wherein the housing includes:
a body unit;
a plurality of filter installation units formed on the body unit and having the optical guide units installed thereon; and
a lens unit formed on the body unit and configured to align an optical signal transceived through the optical cable,
wherein each of the filter installation units is coupled to an edge of each of the optical guide units so as not to interfere with the optical signal,
wherein each of the optical guide units includes:
a lens light guide unit for reception disposed on a straight line with the lens unit and configured to pass an optical signal having a set wavelength or more and to reflect an optical signal having a wavelength less than the set wavelength;
an optical reflection unit for reception disposed to face the lens light guide unit for reception and configured to guide an optical signal reflected by the lens light guide unit for reception;
a long wavelength guide unit for reception disposed on a straight line with the lens light guide unit for reception and configured to guide an optical signal passing through the lens light guide unit for reception to each of the transmitter-receiver units;
a transmission guide unit for reception disposed on a straight line with the lens light guide unit for reception and configured to guide an optical signal generated by each of the transmitter-receiver units to the lens light guide unit for reception; and
a short wavelength guide unit for reception disposed on a straight line with the optical reflection unit for reception and configured to guide an optical signal reflected by the optical reflection unit for reception to each of the transmitter-receiver units.

10. The multiwavelength optical sub-assembly module of claim 9, wherein:
the short wavelength guide unit for reception includes three short wavelength guide units for reception and reflects an optical signal having a wavelength that is shorter with increasing distance from the optical reflection unit for reception; and
the long wavelength guide unit for reception includes two long wavelength guide units for reception and reflects an optical signal having a wavelength that is longer with increasing a distance from the optical reflection unit for reception.

11. The multiwavelength optical sub-assembly module of claim 10, wherein each of the transmitter-receiver units includes:
an optical transmission unit for reception configured to generate an optical signal and transmit the optical signal to the transmission guide unit for reception; and
a plurality of optical receiving units for reception configured to receive optical signals reflected by each of the short wavelength guide units for reception and the long wavelength guide units for reception.

* * * * *